United States Patent
Uh et al.

(10) Patent No.: US 8,096,175 B2
(45) Date of Patent: Jan. 17, 2012

(54) TIRE PRESSURE SENSOR VALVE

(75) Inventors: Sung-Sun Uh, Bucheon-si (KR); Yong-Joon Kim, Bucheon-si (KR)

(73) Assignee: Seetron, Inc., Gyeonggi-do (KR)

( * ) Notice: Subject to any disclaimer, the term of this patent is extended or adjusted under 35 U.S.C. 154(b) by 50 days.

(21) Appl. No.: 12/666,006

(22) PCT Filed: Jun. 20, 2008

(86) PCT No.: PCT/KR2008/003505
§ 371 (c)(1),
(2), (4) Date: Dec. 22, 2009

(87) PCT Pub. No.: WO2009/002048
PCT Pub. Date: Dec. 31, 2008

(65) Prior Publication Data
US 2010/0319447 A1    Dec. 23, 2010

(30) Foreign Application Priority Data
Jun. 22, 2007    (KR) .................. 10-2007-0061583

(51) Int. Cl.
*B60C 23/02* (2006.01)
(52) U.S. Cl. ..................................... 73/146.8
(58) Field of Classification Search .................. None
See application file for complete search history.

(56) References Cited

U.S. PATENT DOCUMENTS

| | | | |
|---|---|---|---|
| 5,101,754 A * | 4/1992 | Bartscher et al. | 116/34 R |
| 5,606,123 A * | 2/1997 | Rabizadeh | 73/146.8 |
| 5,717,135 A * | 2/1998 | Fiorletta et al. | 73/146.5 |
| 5,979,232 A | 11/1999 | Halcomb | |
| 6,194,998 B1 * | 2/2001 | Huang | 340/442 |
| 6,418,786 B1 | 7/2002 | Holcomb | |
| 6,591,672 B2 | 7/2003 | Chuang et al. | |
| 6,655,203 B2 | 12/2003 | Hsu | |
| 7,059,178 B2 | 6/2006 | Fischer et al. | |
| 7,284,419 B2 * | 10/2007 | Rutherford | 73/146.8 |
| 2003/0024463 A1 * | 2/2003 | Evans et al. | 116/34 R |
| 2004/0187567 A1 * | 9/2004 | Durr et al. | 73/146 |
| 2010/0326180 A1 * | 12/2010 | Nagora et al. | 73/146.8 |
| 2011/0048121 A1 * | 3/2011 | van der Blom | 73/146.3 |

FOREIGN PATENT DOCUMENTS

| | | |
|---|---|---|
| JP | 2001-174356 | 6/2001 |
| KR | 1020050097406 | 10/2005 |
| KR | 1020060053220 | 5/2006 |

OTHER PUBLICATIONS

International Search Report in PCT/KR2008/003505, dated Oct. 31, 2008.

* cited by examiner

*Primary Examiner* — Andre Allen
(74) *Attorney, Agent, or Firm* — Womble Carlyle

(57) ABSTRACT

Provided is a tire pressure sensor valve that can be easily installed to a 2-piece or 3-piece inch-up wheel and protect a tire pressure sensor when removing a tire. The tire pressure sensor valve includes a sensor housing including a mounting space for receiving a PCB to which circuit parts including an air pressure sensor are mounted, and a coupling recess for coupling, a valve body including a head and an inner air inlet hole having an opening-closing member, the head being inserted into the coupling recess of the sensor housing and fixed to the sensor housing through a screw, and a valve adapter including a threaded end such that the end is covered with a valve cap.

8 Claims, 5 Drawing Sheets

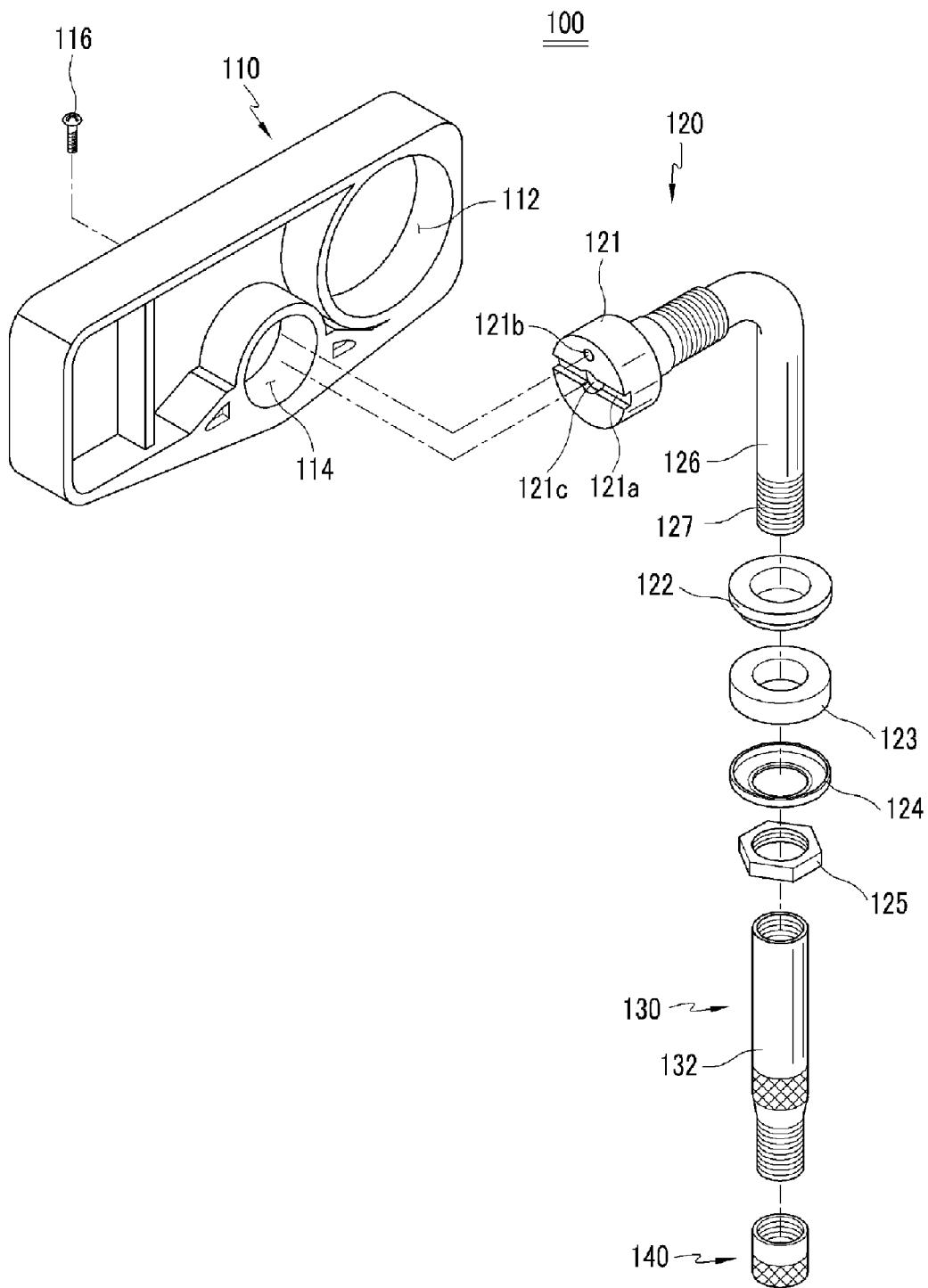
[Fig. 1]

[Fig. 2]
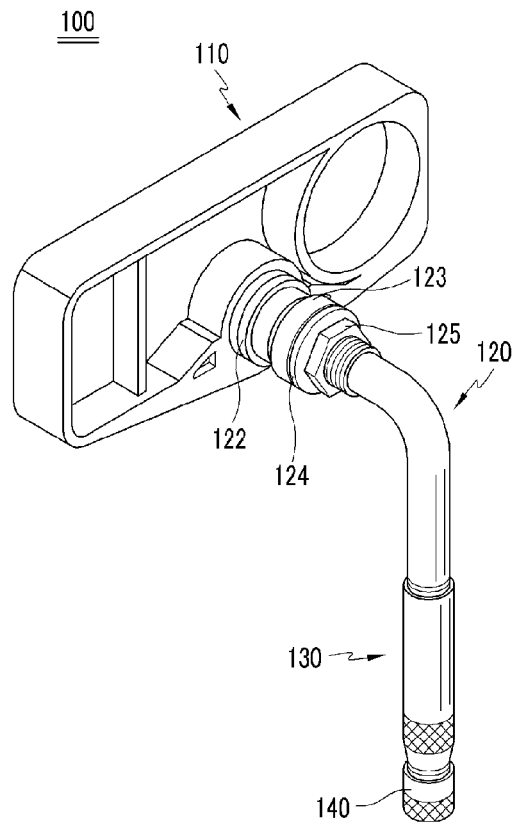
[Fig. 3]
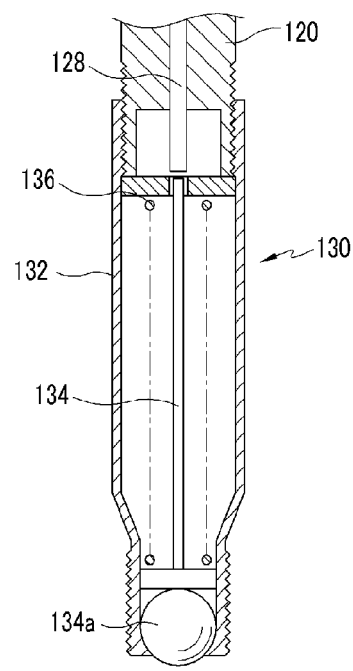

[Fig. 4]
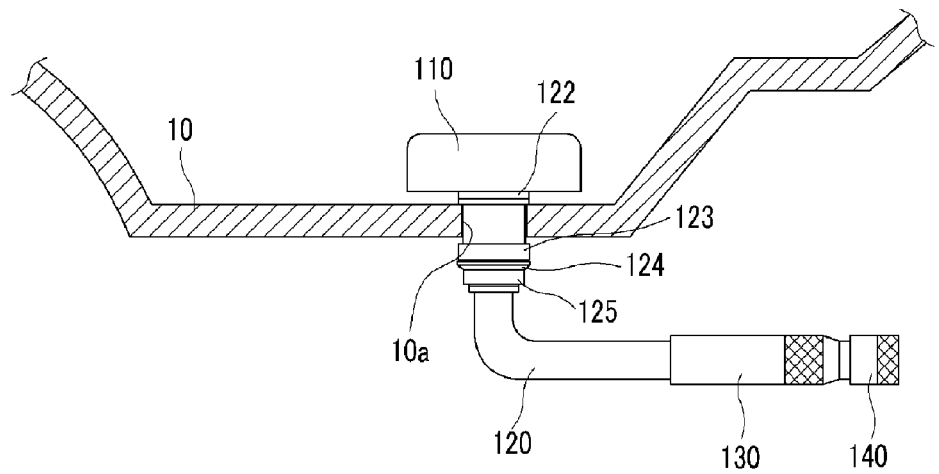
[Fig. 5]
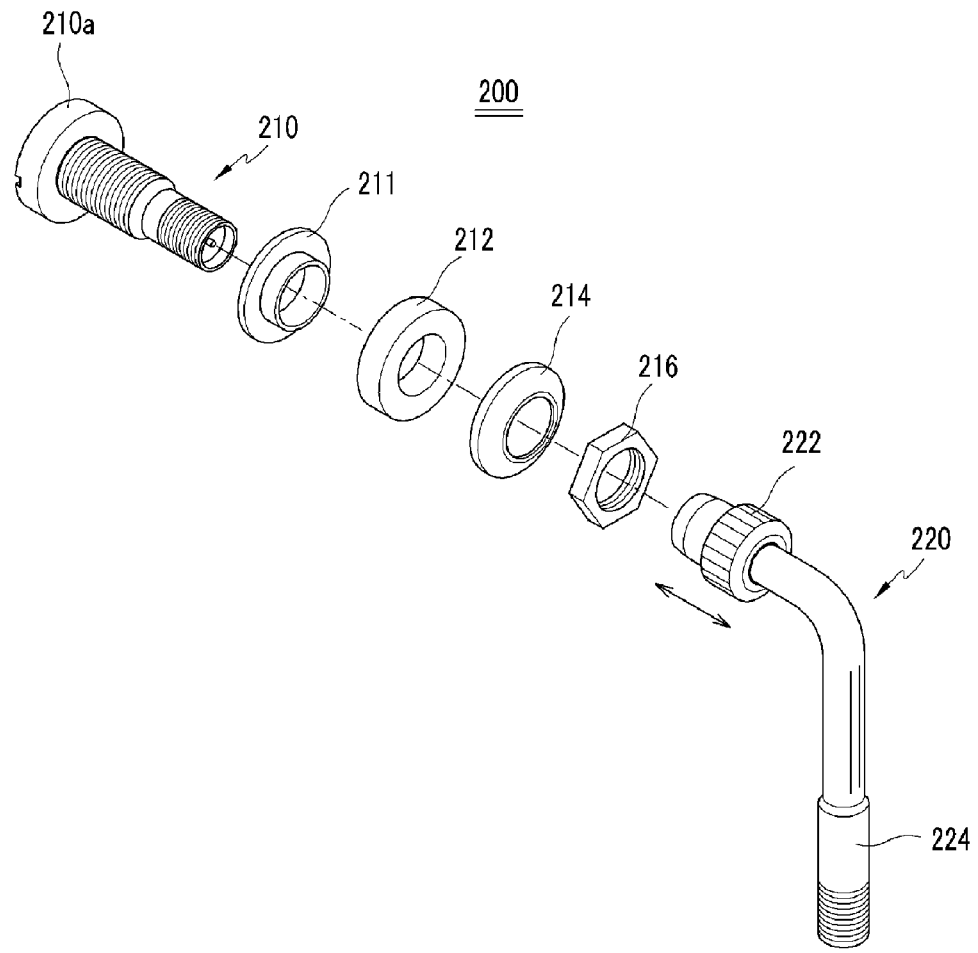

[Fig. 6]
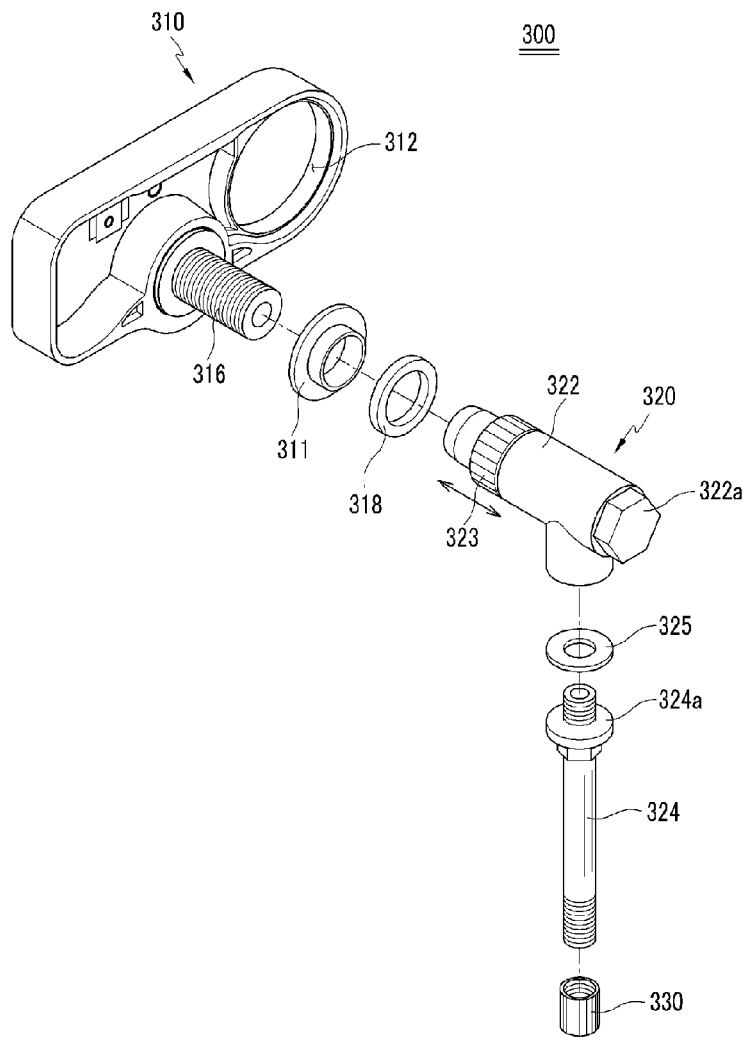
[Fig. 7]
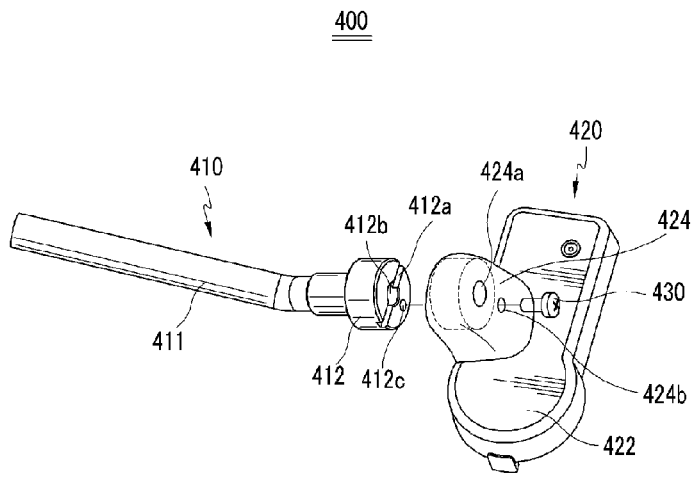

[Fig. 8]
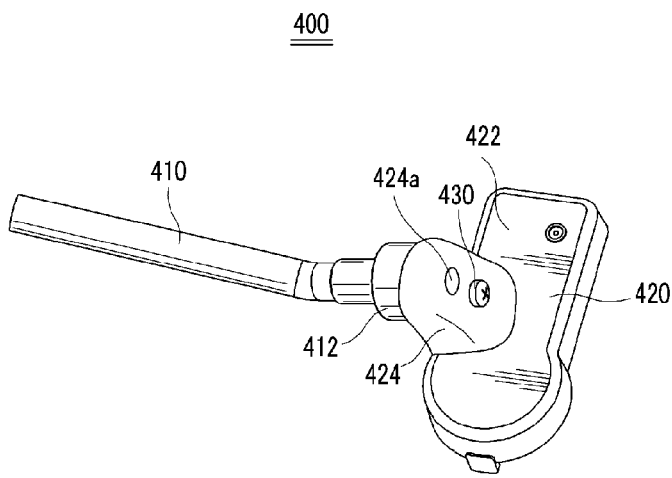
[Fig. 9]
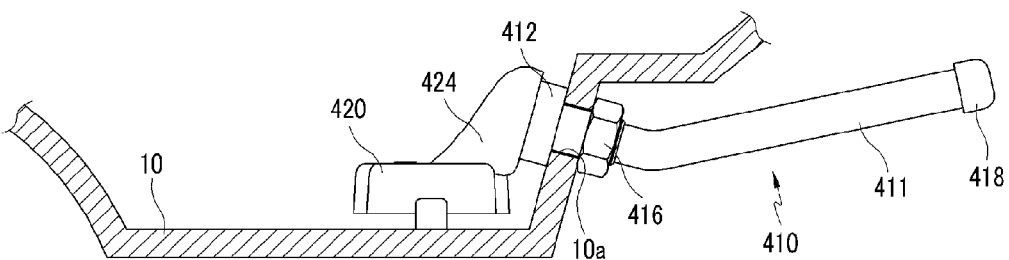

TIRE PRESSURE SENSOR VALVE

TECHNICAL FIELD

The present invention relates to a tire valve for pumping air into a tire, and more particularly, to a removable tire pressure sensor valve that can include a mountable tire pressure sensor for sensing a tire pressure and a tire temperature and transmitting a signal thereof and protect the tire pressure sensor when removing a tire.

BACKGROUND ART

Generally, a tire with a wheel is in contact with a ground to support the load of a vehicle and absorb a shock from the ground and change a direction of the vehicle and transmit a driving force and a braking force to the ground. Today, tubeless tires are widely used for the stability in high speed driving, in which a special rubber (an inner liner) without air transmissivity is attached to an inner surface of the tire to prevent air leakage from the tire and a rim. A tire valve (a rim valve) is attached to the rim of a wheel to pump air into the tire, in which the tire valve includes a valve stem, a nut, and a valve cap.

Meanwhile, as the volume of traffic increases, a tire pressure monitoring system (TPMS) is used to increase safety in driving such that a driver in a vehicle can monitor conditions (mainly, a tire pressure and a tire temperature) of a tire. The TPMS is installed to a rim of a wheel in a tire and includes a tire pressure sensor and a tire monitor. The tire pressure sensor measures a tire pressure and then transmits a signal by wireless. The tire monitor is installed on a dashboard of a vehicle and informs a driver of conditions of the tire. At this point, the tire pressure sensor is required to be installed to the rim to measure the pressure and a temperature in the tire. However, a related art tire valve (a rim valve) is fastened in a tire and is difficult to attach a tire pressure sensor. Thus, a tire valve is required to have a structure where a tire pressure sensor is easily attached.

Particularly, as a premium trend spreads in the automobile market in recent years, inch-up wheels, the diameter of which is increased, are widely used. Such an inch-up wheel has a 2-piece or 3-piece structure to improve design. A wheel with the 3-piece structure typically includes a wheel disk, a well, and a flange, and a wheel with the 2-piece wheel includes a wheel disk and a flange.

To apply the TPMS, a tire pressure sensor valve must be installed to a wheel, but a 2-piece or 3-piece wheel employs a 17-inch or more wide tire. Since such a wide tire has a low aspect ratio ranging from 30% to 40%, a tire pressure sensor is liable to break when removing a tire bead and a rim for replacing the tire. That is, in the case of an inch-up wheel, a tire pressure sensor is installed to a rim out of a drop center of a wheel, and thus liable to collision with a tire bead.

SUMMARY OF THE INVENTION

The present invention has been made in an effort to meet the above-described requirement of the related art. An object of the present invention is to provide a tire pressure sensor valve that can be easily installed to a 2-piece or 3-piece inch-up wheel.

The present invention has been made in an effort to solve the above-described problem of the related art. Another object of the present invention is to provide a tire pressure sensor valve that can prevent the breakage of a tire pressure sensor when installing/removing a tire by unscrewing a nut on the outside of a rim and making a removable valve body short such that the tire pressure sensor is dropped within the tire.

To achieve the objects of the present invention, there is provided a tire pressure sensor valve including: a sensor housing including a mounting recess for receiving a printed circuit board (PCB) to which circuit parts including an air pressure sensor are mounted, and a coupling recess for coupling; a valve body including a head and an inner air inlet hole, the head being inserted into the coupling recess of the sensor housing and fixed to the sensor housing through a screw; and a valve adapter including a threaded end such that the end is covered with a valve cap.

The valve body may have an "L" shape, and the valve adapter may have a straight line shape. Alternatively, the valve body may have a straight line shape, and the valve adapter may have an "L" shape. A coupling member is inserted into the sensor housing, and the valve body is coupled to the sensor housing through the inserted coupling member.

The opening-closing member extension may include an extension bar, and an elastic spring which exerts an outward force on the extension bar. When pumping air, a protrusion of the extension bar is pressed by an external pressure, and the protrusion arises toward an inner side and pushes inward the opening-closing member of the valve body to allow the pumping of the air. When the pumping of the air is completed, the elastic spring and an air pressure force the opening-closing member extension back to close an air inlet.

A tire pressure sensor valve of the present invention includes a tire pressure sensor sensing a tire pressure and a tire temperature and transmitting a signal, a tire valve for pumping air into a tire, and a valve adapter, and thus is easily installed to a 2-piece or 3-piece inch-up wheel.

Also, a tire pressure sensor valve of the present invention can protect a tire pressure sensor by unscrewing a nut on the outside of a rim, removing a valve adapter, and then dropping a removed tire valve with the tire pressure sensor in a tire when removing the tire.

BRIEF DESCRIPTION OF THE DRAWINGS

FIG. 1 is an exploded perspective view illustrating a tire pressure sensor valve according to a first embodiment of the present invention.

FIG. 2 is a perspective view illustrating the assembled tire pressure sensor valve according to the first embodiment of the present invention.

FIG. 3 is a cross-sectional view illustrating an adapter according to the first embodiment of the present invention.

FIG. 4 is a side view illustrating the tire pressure sensor valve installed to a wheel according to the first embodiment of the present invention.

FIG. 5 is an exploded perspective view illustrating a tire pressure sensor valve according to a second embodiment of the present invention.

FIG. 6 is an exploded perspective view illustrating a tire pressure sensor valve according to a third embodiment of the present invention.

FIG. 7 is an exploded perspective view illustrating a tire pressure sensor valve according to a fourth embodiment of the present invention.

FIG. 8 is a perspective view illustrating the assembled tire pressure sensor valve according to the fourth embodiment of the present invention.

FIG. 9 is a side view illustrating the tire pressure sensor valve installed on a wheel according to the fourth embodiment of the present invention.

DETAILED DESCRIPTION

The preferred embodiments of the present invention are referred to in order to gain a sufficient understanding of the present invention, the merits thereof, and the objectives accomplished by the implementation of the present invention. The invention may, however, be embodied in many different forms and should not be construed as being limited to the embodiments set forth herein.

FIG. 1 is an exploded perspective view illustrating a tire pressure sensor valve according to a first embodiment of the present invention. FIG. 2 is a perspective view illustrating the assembled tire pressure sensor valve according to the first embodiment of the present invention. FIG. 3 is a cross-sectional view illustrating a valve adapter according to the first embodiment of the present invention. According to the first embodiment, an "L"-shaped valve body is extended to a straight line-shaped adapter.

Referring to FIGS. 1 and 2, a tire pressure sensor valve 100 includes a tire pressure sensor housing 110, a valve body 120, a valve adapter 130, and a valve cap 140. The tire pressure sensor housing 110 includes recesses 112 and 114. The mounting recess 112 receives a printed circuit board (PCB) to which circuit parts including a sensor and a battery are mounted. The coupling recess 114 is coupled to a head 121 of the valve body 120. The valve body 120 includes the head 121 and an air inlet hole 121c. The head 121 is inserted into the coupling recess 114 of the sensor housing 110 and fixed to the sensor housing 110 through a screw 116. An opening-closing member in the air inlet hole closes the air inlet hole using an elastic force in a normal state and opens the air inlet hole to allow air to be introduced when pumping the air and prevents the air in a tire from being leaked to an outside after pumping the air. The valve adapter 130 comprises a hollow stem 132 and may include an opening-closing member extension therein for extending a length of the valve body 120 and operating the opening-closing member such that air pumping is easily performed. The valve cap 140 covers an exposed end of the valve adapter 130.

The sensor housing 110 includes the PCB having the sensor and the circuit parts to sense a tire pressure in an inner space defined by the tire and is fixed to the valve body 120 through the screw 116 when the head 121 is inserted into the coupling recess 114.

The valve body 120 may be bent in an "L" shape as a whole, and includes the opening-closing member to pump air through the air inlet hole 121c. The head 121 of the valve body 120 includes a coupling groove 121a to prevent movement when coupled to the sensor housing 110, an air outlet 121c for pumping air, and a screw hole 121b on the foreface for screw-coupling. Movement prevention is achieved by a coupling groove 121a formed across the foreface of the head and a protrusion fit complementarily into the coupling groove 121a provided in the coupling recess 114. An end of a main body 126 of the valve body 120 has a thread 127 to be coupled to the valve adapter 130.

The valve adapter 130 is coupled to the valve body 120 through the thread 127 disposed in the main body 126, and may include the opening-closing member extension therein such that air pumping is easily performed using the valve adapter 130, as illustrated in FIG. 3. Referring to FIG. 3, an elastic spring 136 exerts an outward force on an extension bar 134 of the opening-closing member extension, and when pumping air, a protrusion 134a of the extension bar 134 is pressed and the protrusion 134a arises toward an inner side and raises a bar 128 of the opening-closing member of the valve body 120 to allow the pumping of the air. When the pumping of the air is completed, the elastic spring 136 and an air pressure force the opening-closing member extension back to close an air inlet and prevent air leakage.

The valve cap 140 is threaded onto the end of the valve adapter 130 in the normal state except for the case where air is pumped, to prevent the ingress of a foreign object through the air inlet, and the air leakage caused by the push back of the extension bar 134 toward the inner side.

Referring to FIGS. 2 and 4, the tire pressure sensor valve 100 is installed through a hole 10a provided in an enter disk of a 2 piece or 3 piece wheel 10, to fix the tire pressure sensor housing 110 to the wheel 10 and simultaneously provide convenience in pumping air. That is, after a protruding grommet 122 comes in close contact with the valve head 121 on an inner side of the wheel 10, a flat grommet 123 is positioned on an outer side of the wheel 10, and then a washer 124 is fitted on the outer side of the wheel 10, and a nut 125 is screwed, so that the grommets 122 and 123 are compressed on the both sides of the wheel 10 to prevent air leakage and fix the valve body 120 to the wheel 10. Thereafter, the valve adapter 130 is connected to the valve body 120, and then the valve cap 140 is coupled to the valve adapter 130.

FIG. 4 is a side view illustrating the tire pressure sensor valve 100 installed to the disk of the wheel 10 according to the first embodiment of the present invention.

Referring to FIG. 4, the 3 piece wheel 10 includes the enter disk, an inner rim, and an outer rim, which are coupled through pieces including a bolt and a nut. A tire pressure sensor valve of the present invention may be installed through the hole 10a of the enter disk.

When removing a tire, the valve adapter 130 is removed from the valve body 120 on the outer side of the wheel 10, then the nut 125 is removed, then the washer 124 and the flat grommet 123 are removed, then the valve body 120 is pushed and dropped into an inner side of the tire together with the tire pressure sensor housing 110, and then a tire bead is removed from the rim, thereby preventing the damage of a tire pressure sensor.

FIG. 5 is an exploded perspective view illustrating a tire pressure sensor valve 200 according to a second embodiment of the present invention, in which a straight line-shaped valve body 210 is extended to an "L"-shaped valve adapter 220.

Referring to FIG. 5, the tire pressure sensor valve 200 includes the straight line-shaped valve body 210, and the "L"-shaped valve adapter 220 threaded onto the straight line-shaped valve body 210 to extend an air inlet path.

The straight line-shaped valve body 210 includes an air inlet hole on an inner side, and an air outlet on an outer side. An opening-closing member in the air inlet hole closes the air inlet hole using an elastic force in a normal state and opens the air inlet hole to allow air to be introduced when pumping the air and prevents the air in a tire from being leaked to an outside after pumping the air. A protruding grommet 211 comes in close contact with a protruding head 210a on an inner side of a rim. A flat grommet 212, a washer 214, and a nut 216 are disposed on an outer side of the rim to install the straight line-shaped valve body 210 to a wheel.

The valve adapter 220 is threaded onto the straight line-shaped valve body 210, and an opening-closing member extension is installed in the valve adapter 220 to provide convenience in pumping air. The valve adapter 220 is threaded onto the valve body 210 through a fastening nut 222 that simultaneously performs fastening and position-adjusting through its horizontal gaps. A main body 224 of the valve adapter 220 is bent in an "L" shape and has a threaded end. An elastic spring exerts an outward force on an extension bar of the opening-closing member extension, and when pumping air, a protrusion of the extension bar is pressed, and the protrusion arises toward an inner side and raises the opening-closing member of the valve body 210 to allow the pumping of the air. When the pumping of the air is completed, an elastic spring and an air pressure force the opening-closing member extension back to close an air inlet and prevent air leakage.

After the head 210a and the protruding grommet 211 is disposed in the rim, the flat grommet 212 and the washer 214 is fitted from the outer side of the rim, and then the nut 216 is screwed, so that the grommets 211 and 212 are compressed on the both sides of the rim to prevent air leakage and fix the valve body 210 to the wheel 10. Thereafter, the valve adapter 220 is connected to the valve body 210 and then a valve cap is coupled to the valve adapter 220.

When removing a tire, the valve adapter 220 is removed from the valve body 210 on the outer side of the wheel 10, then the nut 216 is removed, then the washer 214 and the flat grommet 216 are removed, then the valve body 210 is pushed and dropped into an inner side of the tire together with a tire pressure sensor, and then a tire bead is removed from the rim, thereby preventing the damage of the tire pressure sensor.

FIG. 6 is an exploded perspective view illustrating a tire pressure sensor valve according to a third embodiment of the present invention, in which a coupling member 316 is inserted into a tire pressure sensor module 310 and a "T"-shaped tire valve body 320 is coupled to through the coupling member 316.

Referring to FIG. 6, a tire pressure sensor valve 300 includes the tire pressure sensor module 310, the tire valve body 320, and a valve cap 330. The tire pressure sensor module 310 includes a recess 312 and the inserted coupling member 316. The recess 312 receives a PCB to which circuit parts including a sensor and a battery are mounted. The tire valve body 320 is threaded onto the inserted coupling member 316 and used to pump air. The tire valve body 320 includes a T-coupler 322 and a body 324. The T-coupler 322 changes a coupling direction to the coupling member 316 in an "L" shape. The body 324 is coupled to the T-coupler 322 in a straight line shape and includes an air inlet hole therein. An opening-closing member in the air inlet hole closes the air inlet hole using an elastic force in a normal state and opens the air inlet hole to allow air to be introduced when pumping the air and prevents the air in a tire from being leaked to an outside after pumping the air. An end of the T-coupler 322, penetrating through both a protruding grommet 311 and a flat grommet 318, includes a fastening nut 323 that simultaneously performs fastening and adjusting a position with the coupling member 316. Another end of the T-coupler 322 has a hexagonal part 322a. The body 324 has an end 324a threaded into the T-coupler 322 through a ring 325, and the other end threaded into the valve cap 330.

FIG. 7 is an exploded perspective view illustrating a tire pressure sensor valve according to a fourth embodiment of the present invention. FIG. 8 is a perspective view illustrating the assembled tire pressure sensor valve according to the fourth embodiment of the present invention. A tire pressure sensor valve 400 according to the fourth embodiment of the present invention, includes a valve body 410, a tire pressure sensor 420, and a screw 430 for coupling the valve body 410 to the tire pressure sensor 420.

Referring to FIGS. 7 and 8, the valve body 410 may be bent at a predetermined angle along a stem 411 thereof to provide convenience in pumping air when installed to a wheel 10, and includes an air inlet hole 412b therethrough. A head 412 of the valve body 410 includes a straight line-shaped coupling groove 412a formed across the foreface thereof and a screw hole 412c for receiving the screw 430.

The tire pressure sensor unit 420 includes a housing 422 and a coupling portion 424. Electric circuit devices, for sensing a tire pressure and a tire temperature therein and transmitting a signal by wireless, are mounted to the housing 422. The coupling portion 424 vertically protrudes from the housing 422 and is used for coupling of the valve body 410. The coupling portion 424 includes a head-receiving recess, a through hole 424a for discharging air which corresponds to the air inlet hole 412b of the valve body, and a screw hole 424b through which the screw 430 penetrates to the screw hole 412c of the valve body head 412. The head-receiving recess has a protrusion fitted complementarily into the straight line-shaped coupling groove 412a of the valve body 410.

A tire pressure sensor valve of the present invention is coupled through a screw in the manner where the valve body 410 is integrally screw-coupled to the tire pressure sensor 420 as illustrated in FIG. 8. The valve body 410 may be bent at the predetermined angle to provide convenience in pumping air when installed to the wheel 10. The head 412 is fitted into the head-receiving space and coupled to the tire pressure sensor 420 by the screw 430.

The housing 422 has a round rectangular surface, in which the electric circuit devices for sensing the tire pressure and the tire temperature therein and transmitting a signal by wireless are mounted. The head 412 is coupled to the protruding coupling portion 424 of the housing 422 through the screw 430. Particularly, a bottom of the tire pressure sensor 420 is flat to be effectively attached to a wheel. The coupling portion 424 vertically protrudes from the housing 422 and is fixed at the head-receiving recess with the protrusion fitted in the straight line-shaped coupling groove 412a provided in the head 412 and integrally coupled by the screw 430.

FIG. 9 is a side view illustrating an installation state of the tire pressure sensor valve 400 according to the fourth embodiment of the present invention.

Referring to FIG. 9, the tire pressure sensor valve 400 is fitted into a valve hole 10a disposed in the wheel 10 and in close contact with a rim through a nut 416. Also, a valve cap 418, threaded onto an end of an integrally formed hollow stem 411 of the valve body 410, is uncovered when pumping air and covered after pumping air to prevent ingress of a foreign object into the air inlet hole.

As described above, the tire pressure sensor valve of the present invention installed to an inch-up wheel allows air to be pumped into a tire from the outside after uncovering the valve cap and measure a tire pressure and a tire temperature and transmit a wireless signal, and then a tire monitor, not shown, receives the wireless signal to display the tire pressure and the tire temperature.

Although embodiments have been described with reference to a number of illustrative embodiments thereof, it should be understood that numerous other modifications, variations, replacements, and additions can be devised by those skilled in the art, which will fall within the sprit and scope of the following claims.

The invention claimed is:
1. A tire pressure sensor valve comprising:
    a valve body being provided with an air inlet hole therethrough and a head at one end and a thread at the other end, the head including a screw hole on the foreface thereof;

a sensor housing being provided with a mounting recess for receiving a sensing device and a coupling recess for receiving the head of the valve body; and a valve adapter including one end portion engaged with the thread of the valve body and the other end engageable with a valve cap; wherein:

the head of the valve body is received into the coupling recess and a screw is engaged to the screw hole of the head through the sensor housing; wherein:

the head is provided with a coupling groove formed across the foreface of the head; and the coupling recess is provided with a protrusion fit complementarily into the coupling groove.

2. The tire pressure sensor valve of claim 1, wherein the valve body has an "L" shape, and the valve adapter has a straight line shape.

3. The tire pressure sensor valve of claim 1, wherein the valve body has a straight line shape, and the valve adapter has an "L" shape.

4. The tire pressure sensor valve of claim 1, wherein:

a coupling member is inserted into the sensor housing, and the valve body is coupled to the sensor housing through the inserted coupling member.

5. The tire pressure sensor valve of claim 4, wherein:

the valve body comprises a T-coupler which changes a coupling direction to the coupling member; and the valve body further comprises a body which is coupled to the T-coupler in a straight-line shape.

6. A tire pressure sensor valve comprising:

a valve body being provided with an air inlet hole therethrough and a head at one end thereof, the head including a coupling groove and a screw hole on the foreface thereof, the coupling groove being formed across the foreface; and a tire pressure sensor unit including a housing mounted with a sensing device and a coupling portion protruded from the housing, the coupling portion including a head-receiving recess provided with a through hole corresponding to the air inlet hole of the valve body and a protrusion fit complementarily into the coupling groove of the head, and a screw hole corresponding to the screw hole of the valve body head; wherein:

the head of the valve body is received into the head-receiving recess; and a screw is coupled to the screw hole of the head through the screw hole of the coupling portion.

7. The tire pressure sensor valve according to claim 6, wherein:

the valve body is bent at a predetermined angle along a hollow stem thereof; and a valve cap is threaded onto an end of the hollow stem.

8. The tire pressure sensor valve according to claim 6, wherein:

the hollow stem is integrally formed with the valve body.

* * * * *